United States Patent [19]
Jinnette

[11] 3,900,008
[45] Aug. 19, 1975

[54] AUTOMATIC SEQUENCE UNIT FOR PRODUCT FEEDING TO LIVE STOCK

[76] Inventor: Jimmy Gray Jinnette, 2137 Sunset River Dr., Jacksonville, Fla. 32211

[22] Filed: May 16, 1974

[21] Appl. No.: 470,641

[52] U.S. Cl............................. 119/51.13; 119/51.13
[51] Int. Cl............................................. A01k 5/02
[58] Field of Search............ 119/51.13, 51.14, 51.11; 222/70, 76, 504

[56] References Cited
UNITED STATES PATENTS

| | | | |
|---|---|---|---|
| 579,245 | 3/1897 | Terry | 119/51.11 |
| 779,434 | 1/1905 | Lyon | 119/51.14 |
| 1,424,079 | 7/1922 | Canell | 119/51.13 |

Primary Examiner—Hugh R. Chamblee
Attorney, Agent, or Firm—Birch and Birch

[57] ABSTRACT

A unit providing a casing or housing of portable capability for housing a plurality of feed storage means with solenoid controlled door means for each storage means. The circuit for each solenoid is timer controlled according to desired set time periods to feed live stock, such as dogs, cats or any other animal while the occupants of the house are away.

6 Claims, 5 Drawing Figures

AUTOMATIC SEQUENCE UNIT FOR PRODUCT FEEDING TO LIVE STOCK

BACKGROUND OF THE INVENTION

1. Field of Invention

The present invention relates to an automatic feeding unit and more particularly to a unit for housing a plurality of automatically controlled feed storage means, such as compartments or boxes each with electric timer controlled door means with solenoid controlled latch means in circuit with the timer to provide sequential delivery of predetermined quantities of feed products from the compartment or boxes.

2. Description of Prior Art

Heretofore prior to the present novel timer controlled sequential feed delivery means for live stock, there have been patents for timed automatic stock feeders, namely;

U.S. Pat. Nos. 245,795; 461,457; 1,405,431; 2,538,413; 2,585,371; 3,180,318; 3,144,173; 3,330,256; and 3,683,859.

However, all of such prior patented feeder apparatus, systems and methods have lacked compact unification in a single unit plus the refinements and efficiency of the present novel stock feeder apparatus and system.

BRIEF SUMMARY OF THE INVENTION

In accordance with the present invention, the concept of timed sequential animal feeding by electrical solenoid means for measured or calculated feed discharge to the feeding area of an electric plug-in housing unit is arranged in a novel and simplified manner, to thereby provide a single unit as an efficient article of manufacture of prime utility to feed from a plurality of storage boxes to maintain pets or live stock while the master is away.

OBJECTS OF THE INVENTION

An object of the invention is to provide a novel automatic timer controlled feeding unit adapted to be loaded with food, water, medicine or the like, to thereby distribute such loaded products in any timed sequence over a period of days, weeks or longer.

Another object is to provide novel dispenser units, fixed or portable, having a plurality of storage boxes with solenoid timer activated discharge means for each of said storage boxes to a stock feed area, such as provided by a trough at the front of each respective dispenser unit as the respective storage boxes are sequentially unloaded at timed intervals selected by a timer clock.

Another object is to provide solenoid pulling-type coils suitably connected by operator means to open door means having novel door latches spring biased to closed position until the solenoid is energized and pulls the latch to unlatched position to open the door and release the box contents to a feed trough area.

Yet another object is to provide a novel live stock feed dispenser system for dogs or any other animals embodying a novel electric circuit including activator solenoid means for individual push-push switch means in combination with an associated test means controlled and connected to by-pass switch means, to thereby indicate any fault condition in anyone of the respective circuits connected to the respective solenoid activator means.

Still further objects are to provide, in combination, novel housing units so shaped and so proportioned as to enhance the dispensing efficiency of the product discharged from each respective food compartment when the door of such compartment is opened by the latch release imparted by the energization of the respective activator solenoids and operably associated push-push switch means.

A further object is to provide test means for selective test of the condition of the solenoid and switch control to each respective feed box in the dispenser unit, to thereby indicate when anyone of the feed dispenser equipment is faulty.

The above and other objects and advantages of the present invention will appear more fully hereinafter from a consideration of the detailed description which follows, taken together with the accompanying drawings wherein the invention is illustrated. It is to be understood, however, that the drawings are for the purpose of illustration only and are not intended as a definition of the limits of the invention.

BRIEF DESCRIPTION OF THE DRAWINGS

In the drawings, wherein like reference characters refer to like parts throughout the several views.

Figure 1:
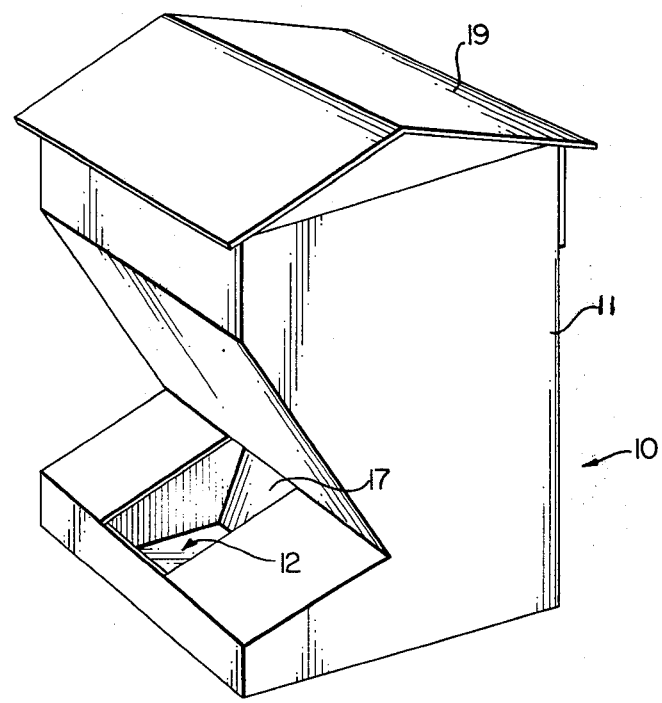
FIG. 1 is a perspective view looking at the front and side of a unit illustrating the present invention with the feed compartments or boxes mounted therein and with their respective doors and latches connected with the solenoid activators for timer door release control.
Figure 2:
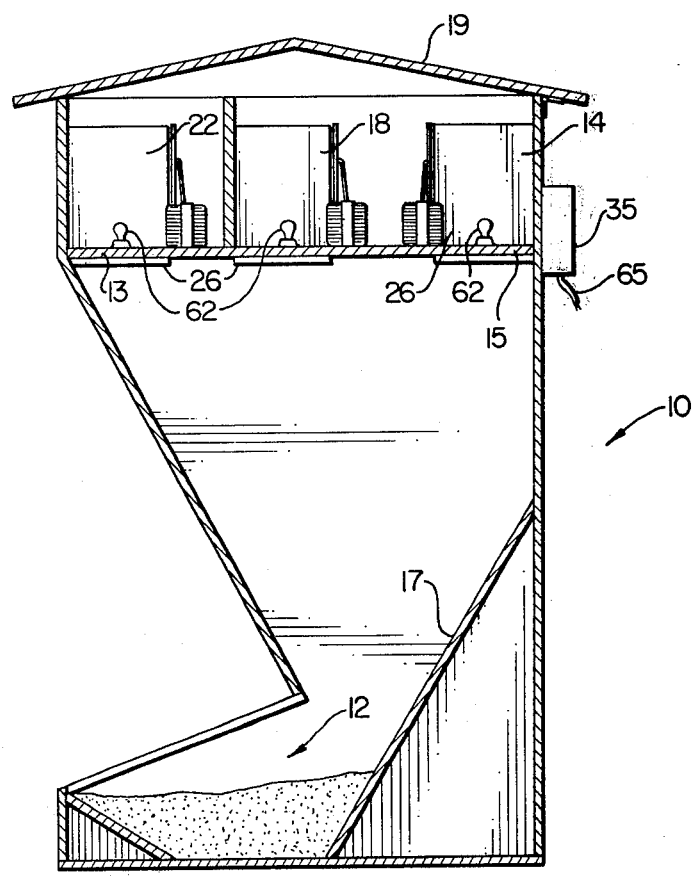
FIG. 2 is a side view of the housing unit in cross section showing one proposed arrangement of the feed boxes, solenoids, electric timer and fault bulb indicators mounted therein.
Figure 3:
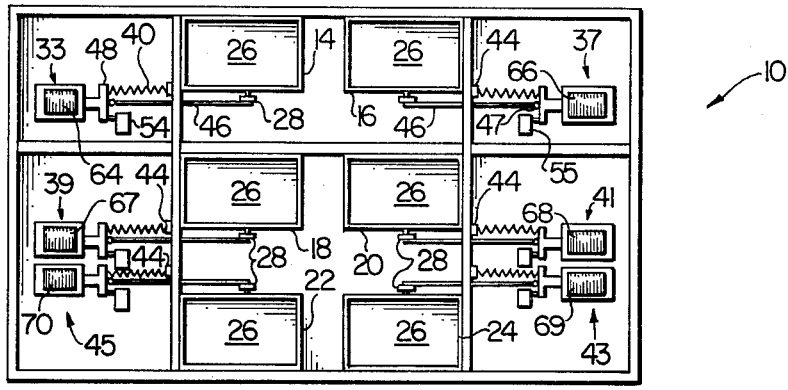
FIG. 3 is a top plan view in elevation of the unit to show a layout of the feed storage boxes and doors and door latches connected to the solenoid armatures.

Referring in detail to the invention and first with reference to FIGS. 1, 2 and 3 of the drawings, there is illustrated a preferred embodiment of the same generally comprising a dispensing unit 10 which houses a plurality of storage containers of boxes 14, 16, 18, 20, 22 and 24 to hold selected products for timed sequential discharge of the storage boxes to the feed area 12 of the unit.

The unit 10 is formed with a relatively large upper section 11 and support panels 13 and 15 for mounting the operating components of the feeding system. The unit from section 11 is provided with a hinged top 19 and a ramp 17 which extends downwardly to a feed trough area 12 to receive the feed discharge from each of a plurality of the storage feed boxes 14, 16, 18, 20, 22 and 24.

The timer 35 may be of any well known type to produce a signal current of relatively short duration at a predetermined manually set time. For example, it includes a clock motor connected to a suitable power source which rotates a dial 34 on which is fastened a trip 31 which is fastened to a trip arm and may be of the type shown in U.S. Pat. No. 2,657,748 issued Nov. 3, 1953.

Figure 5:
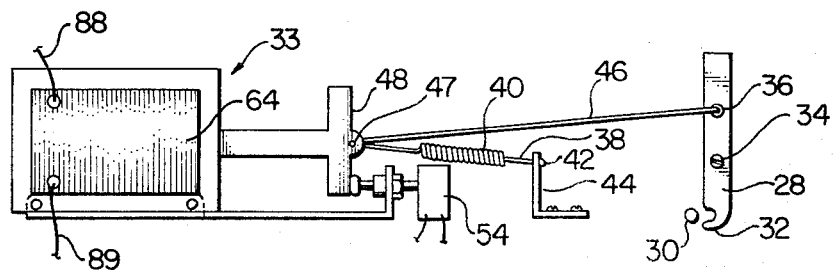
FIG. 5 is a side elevation view of one of the solenoid means, the push-push switch, tether means to trip the latch lever and with the bracket means to mount the several components in the dispensing unit as it appears in more detail removed from its mounting in FIG. 3.

As shown in FIG. 1, there are provided six storage containers or boxes. However, any desired number of storage boxes may be provided and each is made with a door 26 and a pivot means, such as latch bolt 28, see FIG. 5. Each door is identical in structure and includes identical cooperating latch means such as latch bar 30 engageable with the notched head 32 of the bolt 28 when it swings in response to the first of six similar solenoids. The set point timer 35 is mounted on a side wall of the unit 10. These solenoids are identified by numerals 33, 37, 39, 41, 43 and 45 and are each operatively associated with the latch bolt 28 of each storage box door for sequential operation.

The bolt 28 is mounted on a pivot pin 34 projecting from a side wall of its storage box within the 10. The bolt 28, see FIGS. 3 and 5, has an eyelet 36 to provide for one end of the tether link 46. A biasing spring 40 is anchored at one end to an eyelet opening 42 of a bracket 44 supported by the associated panels 13 – 15, see FIG. 3, which couples to the eyelet 47 in the projection formed on a solenoid armature 48 of one of the respective solenoids. The operation of each solenoid and armature will be described in more detail hereinafter with reference to the electric timer means, such as timer clock 35, a by-pass switch 52, push-push switches 54, 56, 57, 58 and 59, and switch position indicator lights 62 wired to each of said respective five push-push switches in the timer controlled circuit, see FIG. 4. Any suitable type of push-push switch may be used, for example, such as General Electric push-push switch identified as part number XV6X53.

TEST OF TIMER FOR START OF OPERATION

When the timer circuit from power leads 63 and 65 to winding 64 is cut off the solenoid winding 64 is de-energized. However, the timer circuit leads 80 and 82 may be activated to energize the circuit by the timer by-pass switch 52 to indicate whether or not the push-push switches 54, 55, 56, 57 and 58 are in proper open position for operation to start the operation cycle. This indication is provided by the lamps 62 connected to switch terminals 84 and 86, which will illuminate only if one of the switches is in closed position. If one of the switches is in closed position then the same must be pushed to place the same in open position, since all switches must be in open position at the start of each timer cycle to provide the proper sequence of operation for each solenoid to control the timed sequence to open the storage box doors 26. The switch 54 has its terminal 84 connected by lead 88 to terminal 90 of the next push-push switch 55 and its terminal 86 is connected by lead 92 to winding 66 of solenoid 37. Also, terminal 94 of switch 55 is similarly connected to winding 67 of the solenoid 39 and from terminal 90 of switch 55 a lead 96 connects to terminal 98 of the push-push switch 56. Then from terminal 98 a lead 100 connects to terminal 102 of the push-push switch 57 with a lead 104 to terminal 106 of the final switch 58.

The windings of each solenoid are each connected by leads 89, 91, 93, 95 and 97 to ground or negative lead 80 to complete the circuit from the timer to the solenoids and the indicator lamps 62 are each connected by similar leads 105 and 107 from switch terminal 86 through the lamp filament to ground line 108.

After the switch positions are tested the timer is started. When a current pulse is next set up by the timer closure of its circuit producing set point contacts, this first provides energization of the winding 64 from leads 88 and 89 connected to the timer leads 80 and 82 with a brief holding voltage. Then door to Box 26 opens, when the timer current cuts off the armature 48 ejects from the winding 64 and closes the push-push switch 54. As the timer again rotates to set point position the next current pulse to the solenoid winding operates the armature 48 and 37 armature to open the storage box door 26. Because the armature is connected to an end of a suitable means, such as the steel cable leader 46 or wire or rod with its opposite end tethered to the upper eyelet end 36 of the swinging door latch bolt 28 pivoted on pin 34 the door latch releases and the box door 26 opens to unload any product in the first feed box 14. This latch bolt 28 is biased into latching position by a suitable means, such as the coil spring 40, until the wire or cable 46 is pulled by the armature 48 as it retracts into the solenoid winding 64 by the leading current pulse set up therein by the timer to release and permit the first storage box door 26 to open and discharge the contents of its box 14.

SEQUENTIAL FEED OPERATION

The storage box doors 26 of the respective feed storage boxes 14, 16, 18, 20, 22 and 24, see FIG. 3, are released by their respective solenoids 33, 37, 39, 41, 43 and 45, which are armed sequentially to unlatch the feed box doors starting with the first feed box door of box 14 each time the clock rotates to the set point for circuit completion to thereby, for example, provide current flow to sequentially arm the several solenoid windings 64, 66, 67, 68, 69 and 70.

The first solenoid winding or coil 64 when energized will hold the armature 48 in its winding to provide latch release of the first feed box door of box 14. The timer clock 35 continues to rotate after the first feed is completed to the trough of the unit 10 and again to the timer set point contact 31 and closes its push-push switch 54. At this time the push-push switch 54 for the next adjacent winding of the second solenoid will be in position and current flows to the second solenoid winding to first arm and then releases its armature to close the second push-push switch. Then when the clock mechanism rotates around again it closes the set point of the circuit to produce current flow at the desired set time through the first push-push switch to the second solenoid to provide for the initial voltage pulse to provide an armed condition of the second winding of the second solenoid 37 to provide release of the door of the second feed box 16. Then when the timer clock rotates to its contact set position again, the current through push-push switch 55 will release the third box door for a third feeding period of the unit 10.

Figure 4:
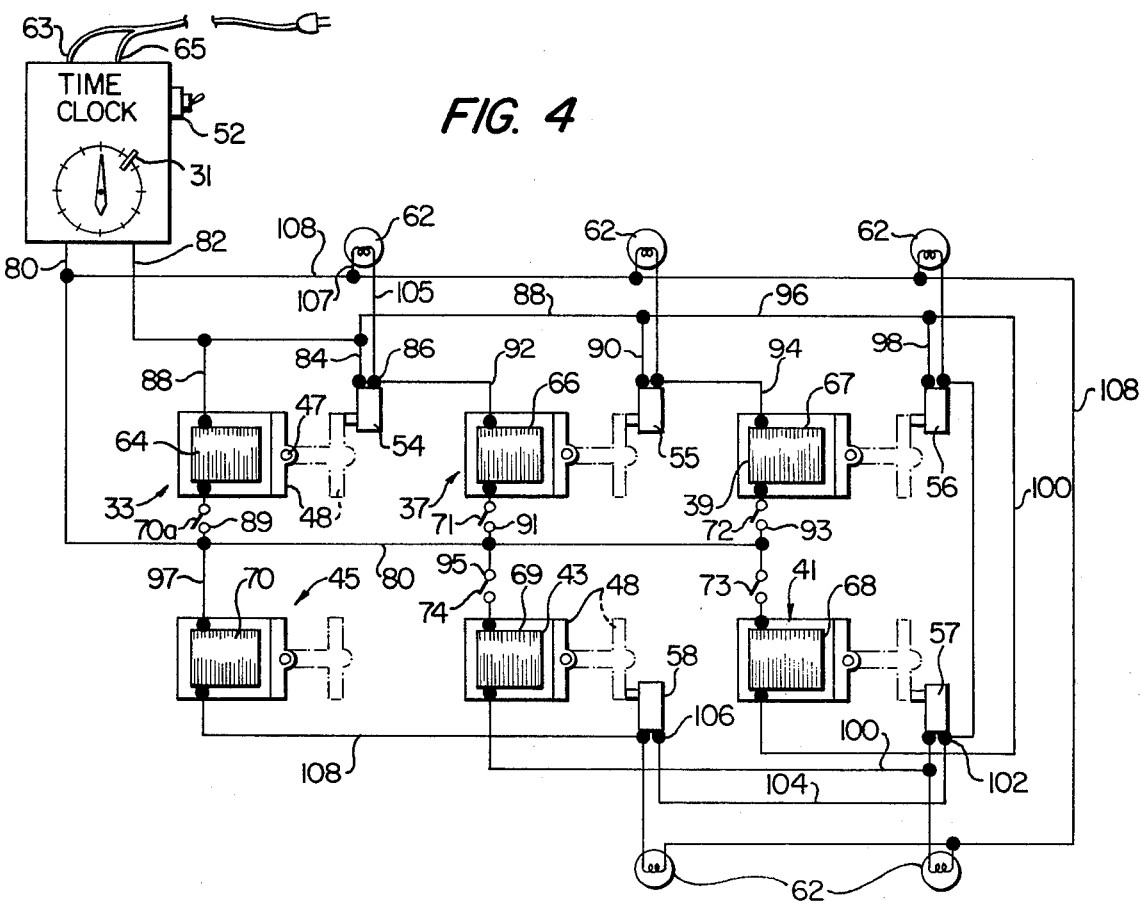
FIG. 4 is a diagrammatic layout of the sequential control wiring diagram and coils for all boxes and indicator lights for the several individual push-push switches and may include a second embodiment of individual by-pass test switch means.

Then sequentially the third solenoid winding 67 is armed from the current flow from switch 55 and the fourth, fifth and sixth solenoid windings 68, 69 and 70, see FIG. 4, will be armed sequentially to operate in the same way as did the first and second windings of solenoids 33 and 37 to provide for opening their respective storage box doors 26 sequentially for each cycle of the timer.

SECOND EMBODIMENT

Another arrangement of pretest for each individual solenoid and switch system is shown in FIG. 4. In this embodiment suitable by-pass switches 70a, 71, 72, 73 and 74 are inserted in the lead lines 89, 91, 93, 94, 95, 97, to each respective solenoid winding to provide for a selective test of each push-push pull switch position by each bulb 62.

Thus there is provided a novel apparatus and system for the sequential timed feed of live stock at predetermined periods for several days according to pre-set times in the absence of human control. Also, a single housing unit is provided for mounting pluralities of feed storage boxes controlled by the set point of an electric timer device to sequentially energize a circuit and arm and trigger solenoid means to open the feed storage boxes made to hold measured quantities of feed and discharge the same into a feed trough area at the front of the unit.

Without further description it is believed that the advantages of the present invention over the prior art is apparent and while only three embodiments of the invention are illustrated, it is to be expressly understood that the invention is not limited thereto as various changes may be made in the combination and arrangement of the components illustrated, as will now likely occur to others and those skilled in the art. For a definition of the scope or limits of the invention, reference should be had to the appended claims.

What is claimed is:

1. An electric time clock with a set point contact control connected to a power source for sequentially timed product discharge at set desired periods according to manually set periods of the said clock set point control comprising a housing having a feed area, a plurality of feed storage boxes in said housing, door means for each of said boxes, said boxes containing predetermined quantities of a product to be dispensed to the feed area of the housing, door operating solenoid and switch means connected in said timer circuit, whereby said set point contact control sequentially produces electric current to arm and release each solenoid to open said storage doors at the desired set period of the electric time clock.

2. In a stock feed unit comprising a plurality or feed storage boxes each with a door provided with solenoid released door latch means, said unit being formed with a relatively large upper area for housing said boxes and a reduced lower area defining a feed area, in combination with sequential electrical timer means with a power circuit, said means comprising a time clock with a set point switch level to energize said electric power circuit from said timer means, a plurality of solenoid means connected in said timer power circuit, a plurality of push-push electric switch means, by-pass switch means, indicator means controlled by said switch means to determine the position of each of said switch means, said solenoid means being periodically energized by said timer for sequential release of said door latch means, to thereby permit the feed to be dispensed from the said storage feed boxes to the said feed area.

3. In a stock feeder unit, electric timer door release latch means arranged for sequential release of each of a plurality of latched doors, said latch means being operated by said solenoid means in response to sequential and selective energization of said solenoid means, the improvement comprising:
 a. an electric timer means with a manual lever for selective energization of said solenoid means to sequentially control the release of said latch means for each door;
 b. an armature for each solenoid means;
 c. cable means coupled at one end to said armature and at the opposite end to said latch means;
 d. push-push switch means engageable by said armature to push said switch in response to selective energization of its solenoid to a closed position; and
 e. indicator means operated by said switch means when any of said switches are in closed position;
 f. any of said switches being manually pushed to open starting positon, to thereby initiate the sequential selective control of the respective door release latch means to each operatively associated door.

4. In a stock feeder unit, as described in claim 3, wherein said door release latch means is a medially pivoted bolt formed with a notched lower end engageable with a fixed keeper bar, and said cable means is biased to latching position by spring means.

5. An automatic live stock feeder unit shaped and formed with a relatively large upper portion above a reduced portion to define a feed trough area, a plurality of feed storage boxes in the upper portion thereof, said boxes having discharge door means, a ramp leading from said upper portion to said feed trough area, electric timer means with a manual set point electric circuit making means from a power source, said means being operably in circuit connection with a plurality of solenoid means with windings connected in said circuit, latch means operated by said solenoid means, to provide sequential opening of said door means of each respective feed box when current in said circuit sequentially energizes said solenoid windings to discharge feed from the storage boxes sequentially when said latch means is unlatched when the set point is reached to close the circuit making means to said solenoid means, by-pass switch means are included in said circuit, and test means are provided in said circuit operable by said by-pass switch means to determine any faults in the circuit.

6. In a feed dispensing housing for feeding animals, a plurality of feed boxes having door means with solenoid latch release means for opening said door means, solenoid means for each latch, an electric timer means, said solenoid means being activated by said electric timer means connected from a power source to provide a circuit means for said solenoid means, a plurality of switch means in said circuit, with said solenoid means, indicator means for each switch, manual actuated by-pass switch means to by-pass said timer means to close said circuit independently of said timer means and energize said solenoids and test the position of said switch means by said indicator means prior to the start of said timer means, said timer means includes a set point circuit contact making lever to close the timer circuit at desired timer feed dispensing periods, said timer circuit sequentially operating said solenoid means for each timer cycle to the set point position of the electric timer lever to release said latch means and dispense the feed boxes.

* * * * *